United States Patent
Sudre et al.

(10) Patent No.: US 11,920,497 B2
(45) Date of Patent: Mar. 5, 2024

(54) CERAMIC COMPONENT

(71) Applicant: RTX CORPORATION, Farmington, CT (US)

(72) Inventors: Olivier H. Sudre, Glastonbury, CT (US); Nitin Garg, Avon, CT (US); John H. Shaw, West Hartford, CT (US); Kathryn S. Read, Marlborough, CT (US); Cristal Chan, East Hampton, CT (US); Mary Colby, West Hartfod, CT (US); Andrew J. Lazur, La Jolla, CA (US); Tania Bhatia Kashyap, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/541,828

(22) Filed: Dec. 3, 2021

(65) Prior Publication Data

US 2022/0178262 A1 Jun. 9, 2022

Related U.S. Application Data

(60) Provisional application No. 63/121,005, filed on Dec. 3, 2020.

(51) Int. Cl.
 *F01D 5/28* (2006.01)
 *C04B 35/80* (2006.01)

(52) U.S. Cl.
 CPC .............. *F01D 5/282* (2013.01); *C04B 35/80* (2013.01); *F05D 2230/90* (2013.01); *F05D 2300/6033* (2013.01); *F05D 2300/614* (2013.01)

(58) Field of Classification Search
 CPC ....................................................... F01D 5/282
 See application file for complete search history.

(56) References Cited

U.S. PATENT DOCUMENTS

| | | | |
|---|---|---|---|
| 6,235,379 | B1 | 5/2001 | Kameda et al. |
| 6,284,357 | B1 | 9/2001 | Lackey et al. |
| 8,114,799 | B2 | 2/2012 | Subramanian et al. |
| 8,986,845 | B2 | 3/2015 | Kmetz et al. |
| 9,604,886 | B2 | 3/2017 | Lamouroux et al. |
| 9,605,543 | B2 | 3/2017 | Nunez et al. |

(Continued)

OTHER PUBLICATIONS

Abstract of Chai et al. (Mechanical properties of SiC f /SiC composites with alternating PyC/BN multilayer interfaces, Advances in Applied Ceramics: Structural, Functional and Bioceramics, GB, (Jun. 24, 2017), vol. 116, No. 7, ISSN 1743-6753, pp. 392-399 (Year: 2017).*

(Continued)

*Primary Examiner* — Alexandre F Ferre
(74) *Attorney, Agent, or Firm* — Carlson, Gaskey & Olds, P.C.

(57) ABSTRACT

A ceramic matrix composite includes a plurality of ceramic fibers and an interface coating disposed on the plurality of ceramic fibers. The interface coating includes a carbon-based layer disposed on each ceramic fiber of the plurality of ceramic fibers and a boron-nitride based layer disposed on the first carbon-based layer. The ceramic matrix composite also includes a ceramic matrix surrounding the plurality of ceramic fibers. A ceramic matrix composite and a method of forming a ceramic matrix composite component are also disclosed.

20 Claims, 5 Drawing Sheets

(56) References Cited

U.S. PATENT DOCUMENTS

| 9,708,226 B2 | 7/2017 | Lazur |
| 10,370,301 B2 | 8/2019 | Chamberlain et al. |
| 10,401,028 B2 | 9/2019 | Freeman et al. |
| 10,710,111 B2 | 7/2020 | She et al. |
| 2012/0196107 A1 | 8/2012 | Philippe et al. |
| 2014/0133989 A1 | 5/2014 | Belmonte et al. |
| 2015/0291473 A1 | 10/2015 | Schmidt |
| 2016/0229758 A1 | 8/2016 | Kmetz et al. |
| 2019/0322595 A1 | 10/2019 | Magdefrau et al. |

OTHER PUBLICATIONS

European Search Report for European patent Application No. 21211928.3 dated Apr. 19, 2022.

\* cited by examiner

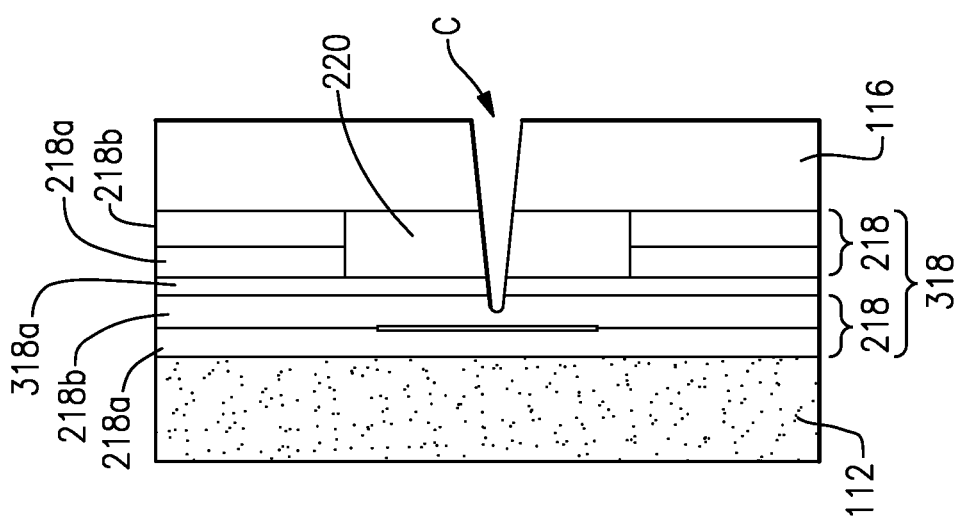
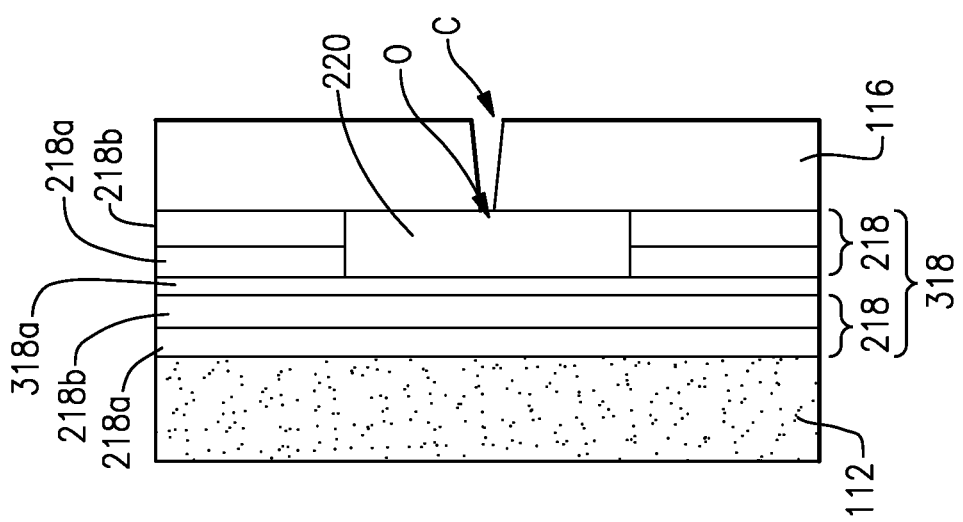
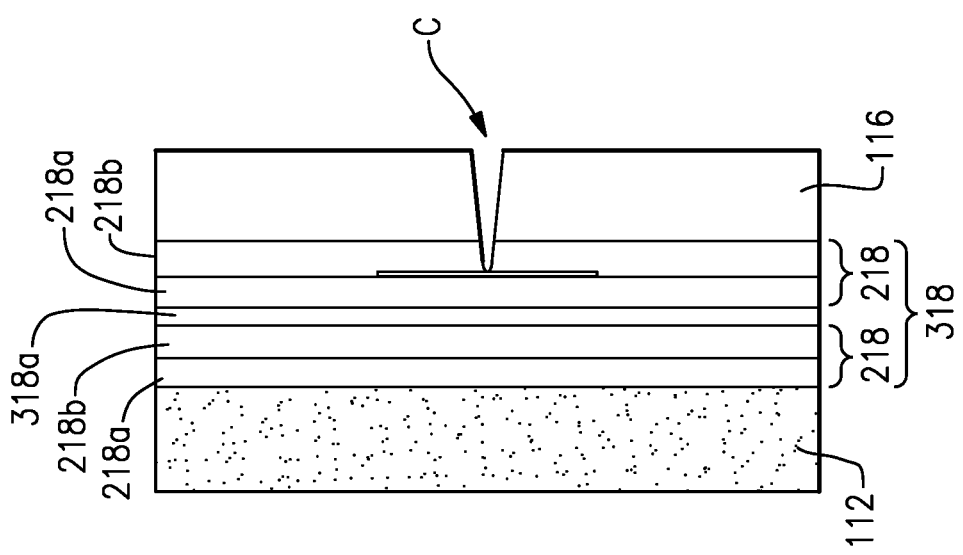

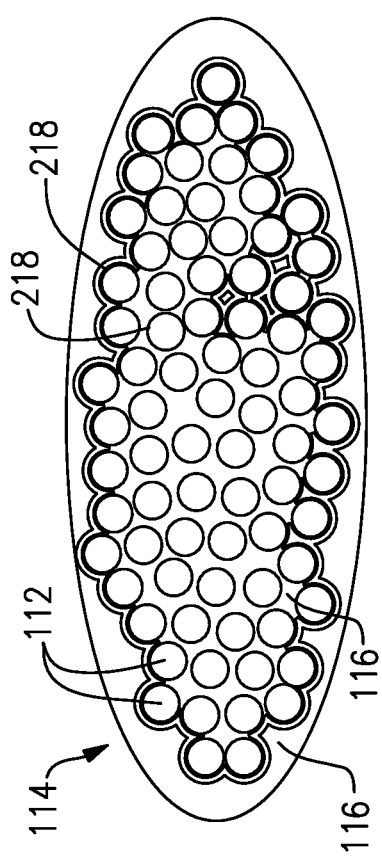
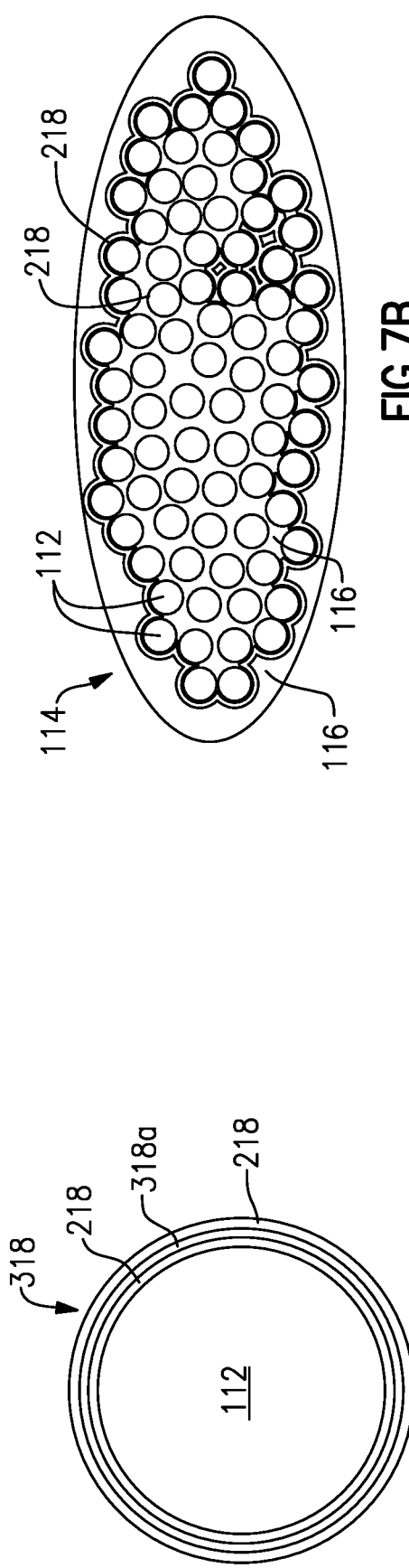
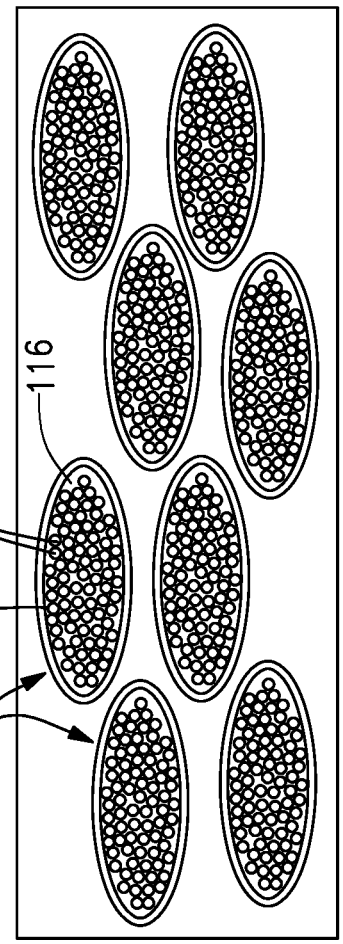

CERAMIC COMPONENT

CROSS-REFERENCE TO RELATED APPLICATIONS

This application claims the benefit of U.S. Provisional Patent Application No. 63/121,005 filed Dec. 3, 2020; the disclosure(s) of which is/are incorporated by reference in its/their entirety herein.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

One example ceramic material is a ceramic matrix composite ("CMC"), which includes, generally, ceramic-based reinforcements (such as fibers) in a ceramic-based material. CMCs have high temperature resistance, and are therefore being considered for use in gas turbine engines, which have areas that operate at very high temperatures. For instance, CMCs are being considered for use in the compressor section, and for airfoils and/or blade outer air seals ("BOAS") in the compressor/turbine sections. Despite its high temperature resistance, there are unique challenges to implementing CMC components in gas turbine engines.

SUMMARY

A ceramic matrix composite according to an exemplary embodiment of this disclosure, among other possible things includes a plurality of ceramic fibers and an interface coating disposed on the plurality of ceramic fibers. The interface coating includes a carbon-based layer disposed on each ceramic fiber of the plurality of ceramic fibers and a boron-nitride based layer disposed on the first carbon-based layer. The ceramic matrix composite also includes a ceramic matrix surrounding the plurality of ceramic fibers.

In a further example of the foregoing, the interface coating is a first interface coating, and further comprising a second interface coating disposed on the first interface coating, the second interface coating including a second carbon-based layer and a second boron-nitride based layer.

In a further example of any of the foregoing, the ceramic matrix composite includes an additional ceramic layer between the first and second interface coating.

In a further example of any of the foregoing, the additional ceramic layer is the same material as the ceramic matrix.

In a further example of any of the foregoing, the additional ceramic layer is silicon carbide.

In a further example of any of the foregoing, the boron-nitride based layer has an epitaxial crystal structure.

In a further example of any of the foregoing, the carbon-based layer includes discontinuous carbon.

In a further example of any of the foregoing, the carbon-based layer includes continuous carbon.

In a further example of any of the foregoing, the ceramic matrix composite makes up a component of a gas turbine engine.

In a further example of any of the foregoing, the component is one of an airfoil and a blade outer air seal.

A ceramic matrix composite according to according to an exemplary embodiment of this disclosure, among other possible things includes a plurality of fiber tows, each of the plurality of fiber tows including a plurality of ceramic fibers; and a first interface coating. The first interface coating includes a first carbon-based layer disposed on each ceramic fiber of the plurality of ceramic fibers and a first boron-nitride based layer disposed on the first carbon-based layer. The ceramic matrix composite also includes a second interface coating. The second interface coating includes a second carbon-based layer and a second boron-nitride based layer. The ceramic matrix composite also includes an additional ceramic layer between the first and second interface coatings and a ceramic matrix surrounding the plurality of fiber tows.

In a further example of the foregoing, the additional ceramic layer is the same material as the ceramic matrix.

In a further example of any of the foregoing, the additional ceramic layer is silicon carbide.

In a further example of any of the foregoing, the first interface coating is disposed on each of the plurality of fibers, the additional ceramic layer is disposed on the first interface coating on each of the plurality of fibers, and the second interface coating is disposed on the additional ceramic layer on each of the plurality of fibers.

In a further example of any of the foregoing, the first interface coating is disposed on each of the plurality of fibers, and the additional ceramic layer and second interface coating are disposed on each of the plurality of fiber tows.

A method of forming a ceramic matrix composite component according to an exemplary embodiment of this disclosure, among other possible things includes providing a plurality of ceramic fibers, disposing a carbon-based layer of an interface coating onto the plurality of ceramic fibers, disposing a boron-nitride based layer of the interface coating into the ceramic-based layer of the interface coating, arranging the fibers into a preform, and infiltrating the preform with a ceramic matrix.

In a further example of the foregoing, disposing the ceramic-based layer of an interface coating onto the plurality of ceramic fibers includes applying a binder to the plurality of fibers, and converting the binder into the carbon-based layer.

In a further example of any of the foregoing, disposing the carbon-based layer of an interface coating forms a continuous carbon-based layer.

In a further example of any of the foregoing, disposing the carbon-based layer of an interface coating forms a discontinuous carbon-based layer.

In a further example of any of the foregoing, the method includes disposing a second carbon-based layer of a second interface coating onto the boron-nitride based layer, disposing an additional ceramic layer onto the second ceramic-based layer, and disposing a second boron-nitride based layer of the second interface coating into the additional ceramic-based layer.

BRIEF DESCRIPTION OF THE DRAWINGS

The various features and advantages of the present disclosure will become apparent to those skilled in the art from the following detailed description. The drawings that accompany the detailed description can be briefly described as follows.

FIGS. 6A-C illustrate a schematic cutaway view of another example interface coating.

FIGS. 7A-C illustrate an interface coating disposed on fibers and tows.

DETAILED DESCRIPTION

Figure 1:
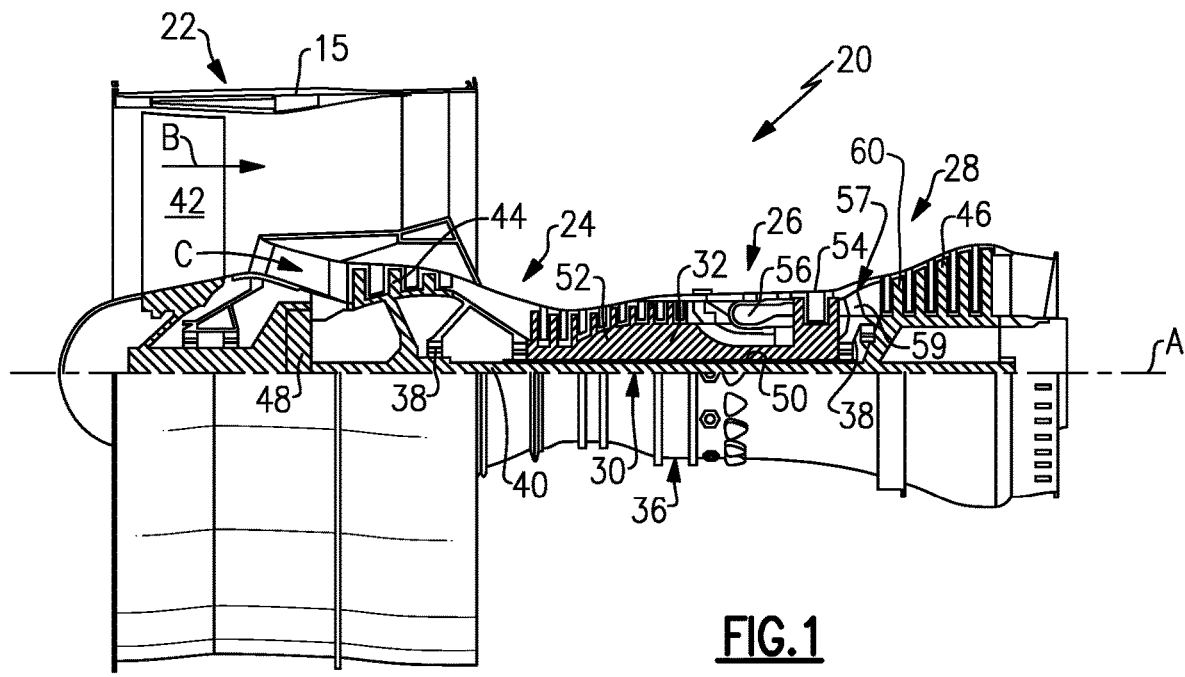
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The low pressure turbine 46 incudes airfoils 60. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
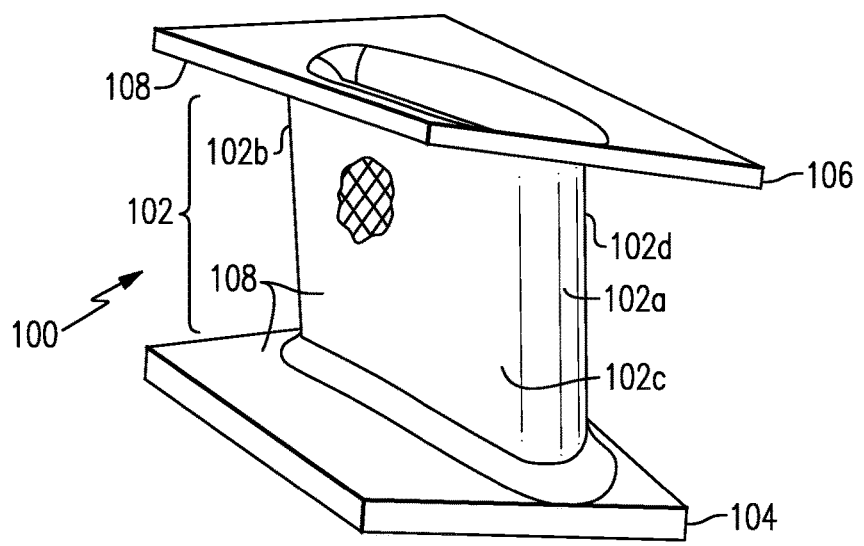
FIG. 2 illustrates an example CMC component, for the gas turbine engine of FIG. 1.

Ceramic matrix composites ("CMC") can be employed in various areas of the engine described above and shown in FIG. 1. For instance, CMC components, or components that are at least partly CMC, can be used in the combustor section 26, or in the turbine/compressor sections 24/28. FIG. 2 shows one non-limiting example CMC component, which is a representative airfoil 100 used in the turbine engine 20 (see also FIG. 1). As shown, the airfoil 100 is a turbine vane; however, it is to be understood that, although the examples herein may be described and shown with reference to turbine vanes, this disclosure is also applicable to blades. Moreover, it should be understood that the description herein is applicable to other types of CMC components, and is not limited to airfoils.

In the illustrated example, the airfoil 100 includes an airfoil section 102 that delimits an aerodynamic profile.

Airfoil section 102 defines a leading end 102a, a trailing end 102b, and first and second sides 102c/102d that join the leading end 102a and the trailing end 102b. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa. In this example, the first side 102c is a pressure side and the second side 102d is a suction side. The airfoil section 102 generally extends in a radial direction relative to the central engine axis A. For a vane, the airfoil section 102 spans from a first or inner platform 104 to a second or outer platform 106. The terms "inner" and "outer" refer to location with respect to the central engine axis A, i.e., radially inner or radially outer. For a blade, the airfoil section 102 would extend from a single inner platform to a free end.

The airfoil section 102 and platforms 104/106 together constitute an airfoil piece. For a blade, the airfoil piece would include only the airfoil section 102 and platform 104. In one example, the airfoil piece is formed of a single, continuous wall 108 that defines the complete or substantially complete shape and contour of the airfoil section 102 and platforms 104/106. In this regard, the airfoil 100 is a unibody construction.

The subsequent description of CMC material may refer to the wall 108 for the unibody example discussed above. However, as noted, the CMC material described herein is applicable to various other uses within the gas turbine engine, including non-unibody airfoil constructions or components for other parts of the gas turbine engine 20 discussed above. Therefore, references to the wall 108 should not be viewed as limiting in this respect.

The wall 108 is formed of a ceramic matrix composite ("CMC") material. CMCs are comprised of a ceramic reinforcement, such as ceramic fibers, in a ceramic matrix. Example ceramic matrices of the CMC are silicon-containing ceramic, such as but not limited to, a silicon carbide (SiC) matrix or a silicon nitride ($Si_3N_4$) matrix. Example ceramic reinforcement of the CMC are silicon-containing ceramic fibers, such as but not limited to, silicon carbide (SiC) fiber or silicon nitride ($Si_3N_4$) fibers.

Figure 3:
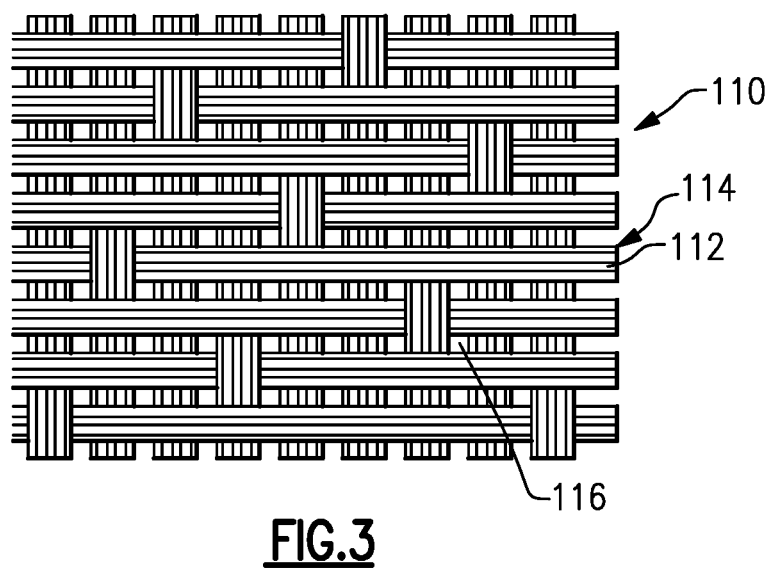
FIG. 3 illustrates an example fiber ply for a CMC component such as the example component of FIG. 2.

FIG. 3 shows a ply 110 of CMC material, which is also schematically shown in a cutaway section in FIG. 2. A ply 110 of CMC material consists of ceramic fibers 112 woven or stacked together. In one example, the fibers 112 are arranged into bundles, known as tows 114. A ceramic matrix material 116 is disposed onto the fibers 112 or tows 114. One example CMC is a SiC/SiC CMC in which SiC fibers 112 are disposed within a SiC matrix 116. The wall 108 is therefore comprised of at least one CMC ply 110 and in some examples includes multiple CMC plies 110, such as two, three, or four plies.

Figure 4A:
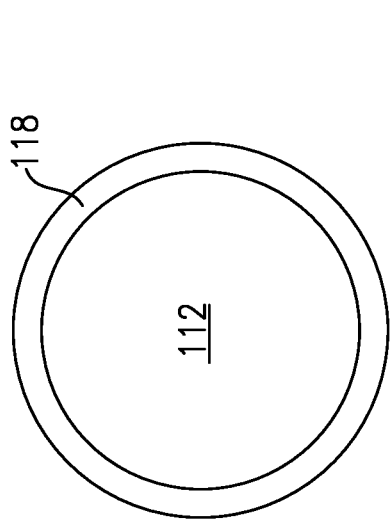
FIGS. 4A-B illustrate an interface coating for fibers or tows of the example CMC component.
Figure 4B:
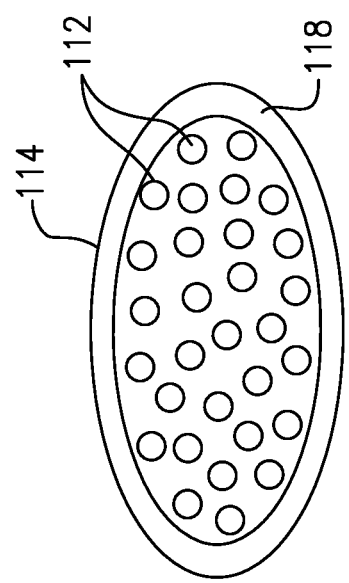

The fibers 112 and/or tows 114 include an interface coating, which modifies the properties of the fibers 112/tows 114. FIG. 4A illustrates an example interface coating 118 disposed on a fiber 112. FIG. 4B illustrates an example interface coating 118 disposed on a tow 114 made up of individual fibers 112. In either example, the interface coating can include one or more layers. The interface coating can be disposed on the fibers 112/tows 114 by a deposition process or another method, and some examples will be discussed in more detail below.

The interface coating 118 can improve the durability, the oxidation resistance, or both of the CMC material, as will be explained in more detail below.

Figure 5B:
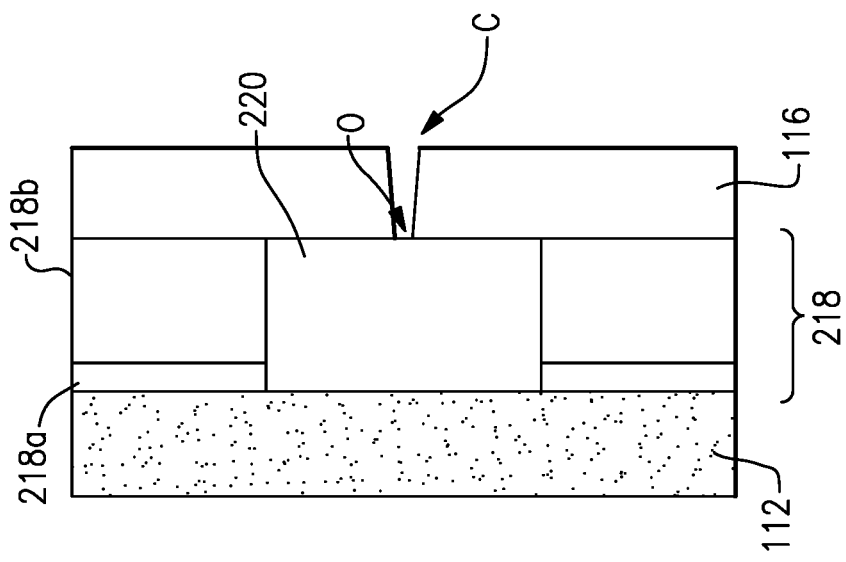
FIGS. 5A-B illustrate a schematic cutaway view of an example interface coating.
Figure 5A:
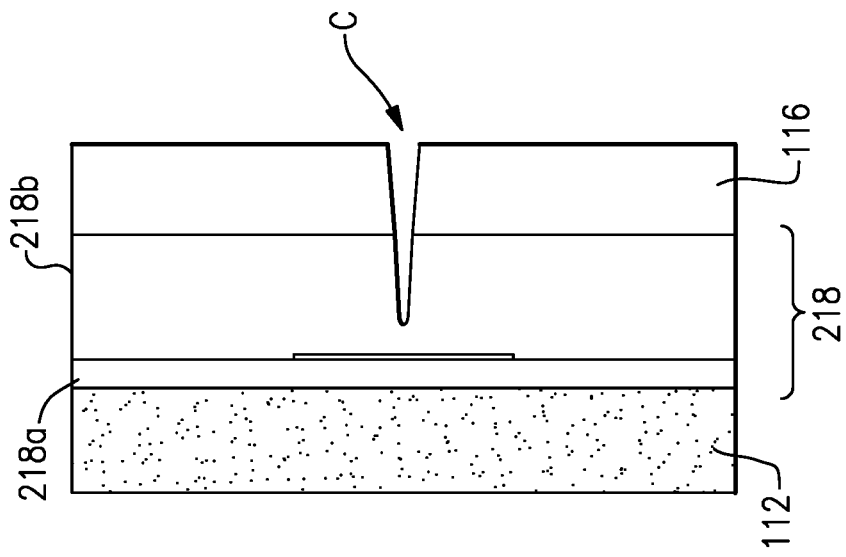

FIGS. 5A-B show a cutaway view of an example interface coating 218. In this example, the interface coating 218 is disposed on a fiber 112, but in other examples, the interface coating 218 could be disposed on a tow 114. In this example, the interface coating includes two layers 218a/218b. The first layer 218a is disposed on the fiber 112. The second layer 218b is disposed on the first layer 218a and is adjacent the matrix 116.

The first layer 218a is a carbon-based layer that includes primarily (e.g., >50%) carbon, but may in some examples include silicon carbide. The carbon can be in a continuous or discontinuous form, or a mixture of continuous and discontinuous forms. Various mechanisms of depositing silicon carbide/carbon onto the fiber 112 are known in the art. For instance, a continuous or primarily continuous carbon layer can deposited by chemical vapor deposition ("CVD") process using a pyrolytic carbon with a natural gas. Other deposition processes, such as chemical vapor infiltration ("CVI") are also contemplated. In another example, a discontinuous carbon-based first layer 218a is formed from a precursor of a binder that is applied to the fibers 112/tows 114 during formation of the CMC material, which is described in more detail below. In this example, the binder can be converted to carbon or discontinuous carbon by a heat treatment step.

The second layer 218b is primarily (e.g., >50%) boron nitride. The second layer 218b could be a boron nitride layer, or could be a boron nitride layer doped with silicon, for instance. The first layer 218a provides a template for the second layer 218b to grow. The second layer can also be deposited by CVD, in one example.

The structure (e.g., discontinuous or continuous), surface roughness, and thickness of the first layer 218a affects the crystal structure of the second layer 218b. Therefore, the structure, composition, and thickness of the first layer 218a can be selected to provide a desired crystal structure of the second layer 218b, which is generally an epitaxial crystal structure with well-defined crystal orientation with respect to the underlying first layer 218a. The thickness of the first layer 218a can be between about 10 and 100 nm (0.0004 and 0.004 mils). In some examples, the ratio of the thickness of the first layer 218a to the second layer 218b is between about 0.05 and 0.2.

In a particular example, the second layer 218b has an epitaxial crystal growth pattern. One example way to encourage growth if an epitaxial second layer 218b is by providing a thin, discontinuous or primarily discontinuous carbon layer 218a, which encourages growth of the boron nitride layer 218b in an epitaxial manner. The carbon layer 218a can be between about 10 and 500 nm (0.0004 and 0.02 mils) thick. This is achievable because the alpha crystal orientation for hexagonal carbon is similar to the alpha crystal orientation for hexagonal boron nitride.

The interface coating 218 improves the durability of the CMC material as follows. A strong bond forms between the first and second layers 218a/218b because of the way the first layer 218a encourages growth of the second layer 218b thereon, as discussed above. In the event of a crack C in the matrix 116 that extends into the second layer 218b, the bond between the first and second layers 218a/218b prevents the crack C from propagating into the first layer 218a by deflecting the crack C, because the crack C generally does not have enough energy to disrupt the bond between the layers 218a/218b.

As shown in FIG. 5B, the second layer 218b can include discrete glassy regions 220, which could be triggered to form by crack C. The discrete glassy regions 220 provide oxidation resistance to the interface coating 218 by reducing oxidant O movement through the interface coating 218 in the event an oxidant O may enter the interface coating 218 through a crack C. One example oxidant O is oxygen.

In the example where the first layer 218a is discontinuous carbon, the discontinuous nature of the carbon may inhibit crack C propagation through the fiber 112/tow 114 in the event the crack C enters the first layer 218a.

FIGS. 6A-C show another example interface coating 318. In this example, the interface coating 318 is disposed on a fiber 112, but in other examples, the interface coating 318 could be disposed on a tow 114. The interface layer 318 includes two interface coatings 218 with an additional ceramic layer 318a disposed in between the two interface coatings 218. The multiple interface coatings 218 and additional ceramic layer 318a provide additional durability and oxidation resistance to the interface coating 318. For instance, if a crack C were to propagate through the outer interface coating 218, as shown in FIG. 6C, the inner interface coating 218 serves as an additional "stop" for the crack C according to the mechanism described above. Moreover, the additional ceramic layer 318a protects the inner interface coating 218 in terms of both resisting crack propagation and oxidation.

The carbon layers 218a of the interface coatings 218 can be the same or different. For instance, the carbon layer 218a of the inner interface coating 218 can be discontinuous while the carbon layer 218a of the outer interface coating 218 can be continuous, or vice versa.

The additional ceramic layer 318a can be the same material as the matrix 116 in some examples. For instance, the additional ceramic layer 318a and the matrix 116 could both be silicon carbide. The additional ceramic layer 318a can be deposited by a CVD process, in one example. The ratio of the thickness of the additional ceramic layer 318a to the diameter (e.g., longest cross-sectional dimension) of the fiber 112 is between about 0.001 and 0.3. In this example, shown in FIG. 7A, the inner interface coating 218 surrounds individual fibers 112, and the additional ceramic coating 318a surrounds fibers 112, and the outer interface coating 218 surrounds the additional ceramic coating 318a.

FIGS. 7B-C show additional example interface coating configurations. In the example of FIG. 7B, the inner interface coating 218 surrounds individual fibers 112, and the matrix 116 surrounds individual fibers 112 and some tows 114, and the outer interface coating 218 surrounds mostly the outer filaments of the tows 114. In the example of FIG. 7C, the interface coating 218 surrounds each individual fiber 112.

The interface coating 118/218/318 is applied to the fibers 112 or tows 114 prior to arranging the fibers 112/tows 114 in the ply 110. In some examples, once the fibers 112/tows 114 are arranged into the ply 110, the ply 110 is stabilized by the application of a binder. In further examples, the binder can also serve to retain the edges of the ply 110, or a mechanical form of edge retention could be used.

The general procedure for forming the ply or plies 110 into a CMC material is as follows. The ply or plies 110 are first preformed, which can include orienting the ply 110 into a desired orientation (which may be based on the weave pattern for instance). The ply 110 may be cut, if desired. The ply 110 may also be pre-formed into a shape near the shape of the desired final component, such as the airfoil wall 108. After preforming, the ply 110 is "layed-up" which includes stacking multiple preformed plies 110. A binder may be used to adhere the plies 110 to one another. After laying up, the plies 110 undergo matrix 116 infiltration. One example method of matrix 116 infiltration is chemical vapor infiltration ("CVI"), which is well-known in the art. In some examples, an optional consolidation step is performed prior to matrix 116 infiltration, which can include compressing the plies 110. After matrix 116 infiltration, final processing steps may include drying.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A ceramic matrix composite, comprising:
   a plurality of ceramic fibers;
   a first interface coating disposed on the plurality of ceramic fibers, wherein the first interface coating includes a carbon-based layer disposed on each ceramic fiber of the plurality of ceramic fibers and a boron-nitride based layer disposed on the first carbon-based layer, and a second interface coating disposed on the first interface coating, the second interface coating including a second carbon-based layer and a second boron-nitride based layer; and
   a ceramic matrix surrounding the plurality of ceramic fibers.

2. The ceramic matrix composite of claim 1, further comprising an additional ceramic layer between the first and second interface coatings.

3. The ceramic matrix composite of claim 2, wherein the additional ceramic layer is the same material as the ceramic matrix.

4. The ceramic matrix composite of claim 2, wherein the additional ceramic layer is silicon carbide.

5. The ceramic matrix composite of claim 2, wherein a ratio of a thickness of the additional ceramic layer to a diameter of the fibers of the plurality of ceramic fibers is between about 0.001 and 0.3.

6. The ceramic matrix composite of claim 1, wherein the boron-nitride based layer has an epitaxial crystal structure.

7. The ceramic matrix composite of claim 1, wherein the carbon-based layer includes discontinuous carbon.

8. The ceramic matrix composite of claim 1, wherein the carbon-based layer includes continuous carbon.

9. The ceramic matrix composite of claim 1, wherein the plurality of ceramic fibers are arranged in tows.

10. The ceramic matrix composite of claim 1, wherein a thickness of the first layer of the first interface coating is between about 10 and 100 nm.

11. The ceramic matrix composite of claim 1, wherein a ratio of the thickness of the carbon-based layer of the first interface coating to a thickness of the boron-nitride-based layer of the first interface coating is between about 0.05 and 0.2.

12. The ceramic matrix composite of claim 1, wherein the boron-nitride based layer of the first interface coating includes at least one discrete glassy region.

13. The ceramic matrix composite of claim 1, wherein one of the carbon-based layer of the first interface coating and the second carbon-based layer of the second interface coating is continuous, and the other of the carbon-based layer of the first interface coating and the second carbon-based layer of the second interface coating is discontinuous.

14. The ceramic matrix composite of claim 1, wherein the ceramic matrix composite forms at least a party of a component of a gas turbine engine.

15. The ceramic matrix composite of claim 14, wherein the component is one of an airfoil and a blade outer air seal.

16. A ceramic matrix composite, comprising:
 a plurality of fiber tows, each of the plurality of fiber tows including a plurality of ceramic fibers;
 a first interface coating, wherein the first interface coating includes a first carbon-based layer disposed on each ceramic fiber of the plurality of ceramic fibers and a first boron-nitride based layer disposed on the first carbon-based layer;
 a second interface coating, wherein the second interface coating includes a second carbon-based layer and a second boron-nitride based layer;
 an additional ceramic layer between the first and second interface coatings; and
 a ceramic matrix surrounding the plurality of fiber tows.

17. The ceramic matrix composite of claim 16, wherein the additional ceramic layer is the same material as the ceramic matrix.

18. The ceramic matrix composite of claim 16, wherein the additional ceramic layer is silicon carbide.

19. The ceramic matrix composite of claim 16, wherein the first interface coating is disposed on each of the plurality of fibers, the additional ceramic layer is disposed on the first interface coating on each of the plurality of fibers, and the second interface coating is disposed on the additional ceramic layer on each of the plurality of fibers.

20. The ceramic matrix composite of claim 16, wherein the first interface coating is disposed on each of the plurality of fibers, and the additional ceramic layer and second interface coating are disposed on each of the plurality of fiber tows.

* * * * *